US011176241B2

(12) United States Patent
Horie et al.

(10) Patent No.: US 11,176,241 B2
(45) Date of Patent: Nov. 16, 2021

(54) ELECTRIC DEVICE, POWER DEVICE, ELECTRIC DEVICE SYSTEM, AND MANAGEMENT DEVICE

(71) Applicant: Koki Holdings Co., Ltd., Tokyo (JP)

(72) Inventors: Yuki Horie, Ibaraki (JP); Yuta Noguchi, Ibaraki (JP); Kazuhiko Funabashi, Ibaraki (JP)

(73) Assignee: Koki Holdings Co., Ltd., Tokyo (JP)

( * ) Notice: Subject to any disclaimer, the term of this patent is extended or adjusted under 35 U.S.C. 154(b) by 0 days.

(21) Appl. No.: 16/345,729

(22) PCT Filed: Oct. 6, 2017

(86) PCT No.: PCT/JP2017/036473
§ 371 (c)(1),
(2) Date: Apr. 29, 2019

(87) PCT Pub. No.: WO2018/079233
PCT Pub. Date: May 3, 2018

(65) Prior Publication Data
US 2019/0258797 A1 Aug. 22, 2019

(30) Foreign Application Priority Data

Oct. 31, 2016 (JP) .............................. JP2016-213678

(51) Int. Cl.
*G06F 21/44* (2013.01)
*B25F 5/00* (2006.01)
(Continued)

(52) U.S. Cl.
CPC ............. *G06F 21/445* (2013.01); *B25F 5/00* (2013.01); *G06F 21/34* (2013.01); *G06F 21/81* (2013.01);
(Continued)

(58) Field of Classification Search
CPC ........ G06F 21/445; G06F 21/34; G06F 21/81; B25F 5/00; H01M 10/42; H01M 10/44; H02J 7/00
See application file for complete search history.

(56) References Cited

U.S. PATENT DOCUMENTS

| 7,813,715 | B2 * | 10/2010 | McKillop | G06F 21/445 455/410 |
| 2013/0031623 | A1 * | 1/2013 | Sanders | G06F 21/34 726/19 |

(Continued)

FOREIGN PATENT DOCUMENTS

| JP | 2012061543 | 3/2012 |
| JP | 2013188803 | 9/2013 |

(Continued)

OTHER PUBLICATIONS

"International Search Report (Form PCT/ISA/210) of PCT/JP2017/036473," dated Nov. 28, 2017, with English translation thereof, pp. 1-4.

(Continued)

*Primary Examiner* — Mohamed Barakat
(74) *Attorney, Agent, or Firm* — JCIPRNET

(57) ABSTRACT

Provided is an electric device, power device, electric device system, and management device capable of providing a theft prevention function that requires less effort as compared to the prior art. A power tool comprises a main power tool unit, and a battery pack 4 which can be attached to and removed from the main power tool unit. The main power tool unit and the battery pack each have a storage means for storing at least one authentication code and a communication means for transmitting and receiving the authentication code, and permit use when an authentication code received via the communication means matches at least one of the authentication codes stored in the storage means, and do not permit use when said authentication code does not match any of the authentication codes. The authentication code is set by a management device which is an external device.

17 Claims, 8 Drawing Sheets

(51) Int. Cl.
*G06F 21/34* (2013.01)
*G06F 21/81* (2013.01)
*H02J 7/00* (2006.01)
*H01M 10/42* (2006.01)
*H01M 10/44* (2006.01)

(52) U.S. Cl.
CPC ........... *H01M 10/42* (2013.01); *H01M 10/44* (2013.01); *H02J 7/00* (2013.01)

(56) References Cited

U.S. PATENT DOCUMENTS

| | | | |
|---|---|---|---|
| 2014/0158389 A1* | 6/2014 | Ito | B25F 5/00 173/46 |
| 2015/0162646 A1* | 6/2015 | Kawase | H01M 10/48 429/7 |
| 2015/0317473 A1* | 11/2015 | Lim | G06F 21/44 726/16 |

FOREIGN PATENT DOCUMENTS

| | | | | |
|---|---|---|---|---|
| JP | 2013188803 A | * | 9/2013 | ............. B25F 5/021 |
| JP | 2013255965 | | 12/2013 | |
| JP | 2014525842 | | 10/2014 | |
| WO | 2016112827 | | 7/2016 | |

OTHER PUBLICATIONS

"Office Action of Japan Counterpart Application", dated May 26, 2020, with English translation, p. 1-p. 13.

* cited by examiner

| Authentication code (ID) item to be set | Setting of battery pack p |
|---|---|
| Manager code (owner ID) | 1234 |
| First use permission code (ID1 (no condition)) | 5678 |
| Second use permission code (ID2 (with condition)) | 9999 |

|  | | Power tool main | |
|---|---|---|---|
|  | | New type | Old type |
| Battery pack | New type | Determine usable state or unusable state in accordance with authentication code | Use permission/use prohibition |
| | Old type | Use permission/use prohibition | — |

ELECTRIC DEVICE, POWER DEVICE, ELECTRIC DEVICE SYSTEM, AND MANAGEMENT DEVICE

CROSS-REFERENCE TO RELATED APPLICATION

This application is a 371 application of the international PCT application serial no. PCT/JP2017/036473, filed on Oct. 6, 2017, which claims the priority benefit of Japan application no. 2016-213678, filed on Oct. 31, 2016. The entirety of each of the abovementioned patent applications is hereby incorporated by reference herein and made a part of this specification.

TECHNICAL FIELD

The present invention relates to an electric device for battery driving, a power device that supplies power to the electric device, an electric device system, and a management device.

BACKGROUND ART

High-performance power tools are expensive and can be easily carried by hand, and therefore are easily stolen. In addition, power tools are owned by individuals in many cases, and users have to manage their own power tools at the sites of construction, interior design, and the like where many traders enter and leave. The following Patent Literature 1 discloses that an effective time of authentication established after user authentication is provided as a theft prevention measure for a power tool.

CITATION LIST

Patent Literature

[Patent Literature 1]
Japanese Unexamined Patent Application Publication No. 2012-061543

SUMMARY OF INVENTION

Technical Problem

In the theft prevention measure disclosed in Patent Literature 1, there is a problem in that it is necessary to perform authentication again when an effective time elapses, which requires time and effort.

The present invention is contrived in view of such situations, and an object thereof is to provide an electric device, a power device, an electric device system, and a management device which are capable of realizing a theft prevention function without requiring time and effort, as compared with the related art.

Solution to Problem

An aspect of the present invention is an electric device. The electric device includes an electric device main body and a power device which is detachable from the electric device main body, in which each of the electric device main body and the power device includes a storage means for storing at least one authentication code, and a communication means for transmitting and receiving the authentication code, and use is permitted in a case where the authentication code received by the communication means matches at least one of the authentication codes stored in the storage means, and use is not permitted in a case where the authentication code does not match any of the authentication codes.

The authentication code may include a manager code, and the authentication code received by the communication means may be a manager code.

The authentication code may include a first use permission code for permitting unconditional use The authentication code may include a second use permission code for permitting conditional use.

In a case where use is permitted on the basis of the second use permission code, at least any one of a possible use time, a possible work number of times, a possible charge number of times, an allowable current, an allowable temperature, an allowable number of rotations, and an allowable torque may be limited.

Another aspect of the present invention is an electric device.

The electric device is an electric device including an electric device main body from which a power device is detachable, the electric device main body includes a storage means for storing at least one authentication code, and a communication means for transmitting and receiving the authentication code, the power device is a first power device including a storage means for storing at least one authentication code and a communication means for transmitting and receiving the authentication code, or a second power device which is not able to transmit and receive the authentication code. When the first power device is connected to the electric device main body, the electric device main body permits use in a case where the authentication code received by the communication means matches at least one of the authentication codes stored in the storage means and does not permit use in a case where the authentication code does not match any of the authentication codes. The electric device main body is able to be used in a state where the second power device is connected thereto or is able to switch between a usable state and an unusable state in a state where the second power device is connected thereto.

The authentication code may be set by an external device.
Any one of the electric device main body and the power device may include a display unit that displays an authentication result of the authentication code.

A configuration that enables an operator to arbitrarily select a usable state or an unusable state in accordance with the authentication result displayed on the display unit may be adopted.

At least any one of the electric device main body and the power device is configured such that setting indicating non-permission of use is able to be performed by an external device.

Still another aspect of the present invention is an electric device system. The electric device system includes the electric device according to any one of claims 1 to 10, and a management device which is able to communicate with at least one of the electric device main body and the power device, in which the management device includes a display unit that displays the authentication result of the authentication code.

A configuration that enables an operator to arbitrarily select a usable state or an unusable state in accordance with the authentication result displayed on the display unit may be adopted.

Still another aspect of the present invention is a power device which is detachable from an electric device main body. The power device includes a storage means for storing at least one authentication code, and a communication means for transmitting and receiving the authentication code, in which the electric device main body is a first electric device main body including a storage means for storing at least one authentication code and a communication means for transmitting and receiving the authentication code or a second electric device main body which is not able to transmit and receive the authentication code. When the first electric device main body is connected to the power device, the power device permits use in a case where the authentication code received by the communication means matches at least one of the authentication codes stored in the storage means and does not permit use in a case where the authentication code does not match any of the authentication codes. The power device is able to be used in a state where the second electric device main body is connected thereto or is able to switch between a usable state and an unusable state in a state where the second electric device main body is connected thereto.

Still another aspect of the present invention is an electric device system. The electric device system includes an electric device main body, a power device which is detachable from the electric device main body, and a management device which is able to communicate with at least one of the electric device main body and the power device, in which each of the electric device main body and the power device includes a storage means for storing at least one authentication code and a communication means for transmitting and receiving the authentication code, and the management device is able to set non-permission of use with respect to at least one of the electric device main body and the power device.

Still another aspect of the present invention is a management device capable of communicating with the electric device main body and the power device. The management device includes an input means for inputting authentication information, a reception means for receiving a predetermined authentication code from the electric device main body and the power device, and a control means for causing a device which is a transmission source of the predetermined authentication code to be in an unusable state in a case where an authentication code specified by the authentication information input by the input means does not match the predetermined authentication code received by the reception means.

The authentication code may include a manager code, a first use permission code for permitting unconditional use, and a second use permission code for permitting conditional use, the predetermined authentication code may be a manager code, and the control means may permit changes in the first use permission code and the second use permission code of a device which is a transmission source of the manager code in a case where an authentication code specified on the basis of authentication information which is input by the input means matches a manager code received by the reception means.

The management device may be a general-purpose computer.

Meanwhile, any combination of the above-described components and expression of the present invention which is transformed between methods, systems, or the like is also effective as an aspect of the present invention.

Advantageous Effects of Invention

According to the present invention, it is possible to provide an electric device, a power device, an electric device system, and a management device which are capable of realizing a theft prevention function without requiring time and effort, as compared with the related art.

DESCRIPTION OF EMBODIMENTS

Figures 1, 2:
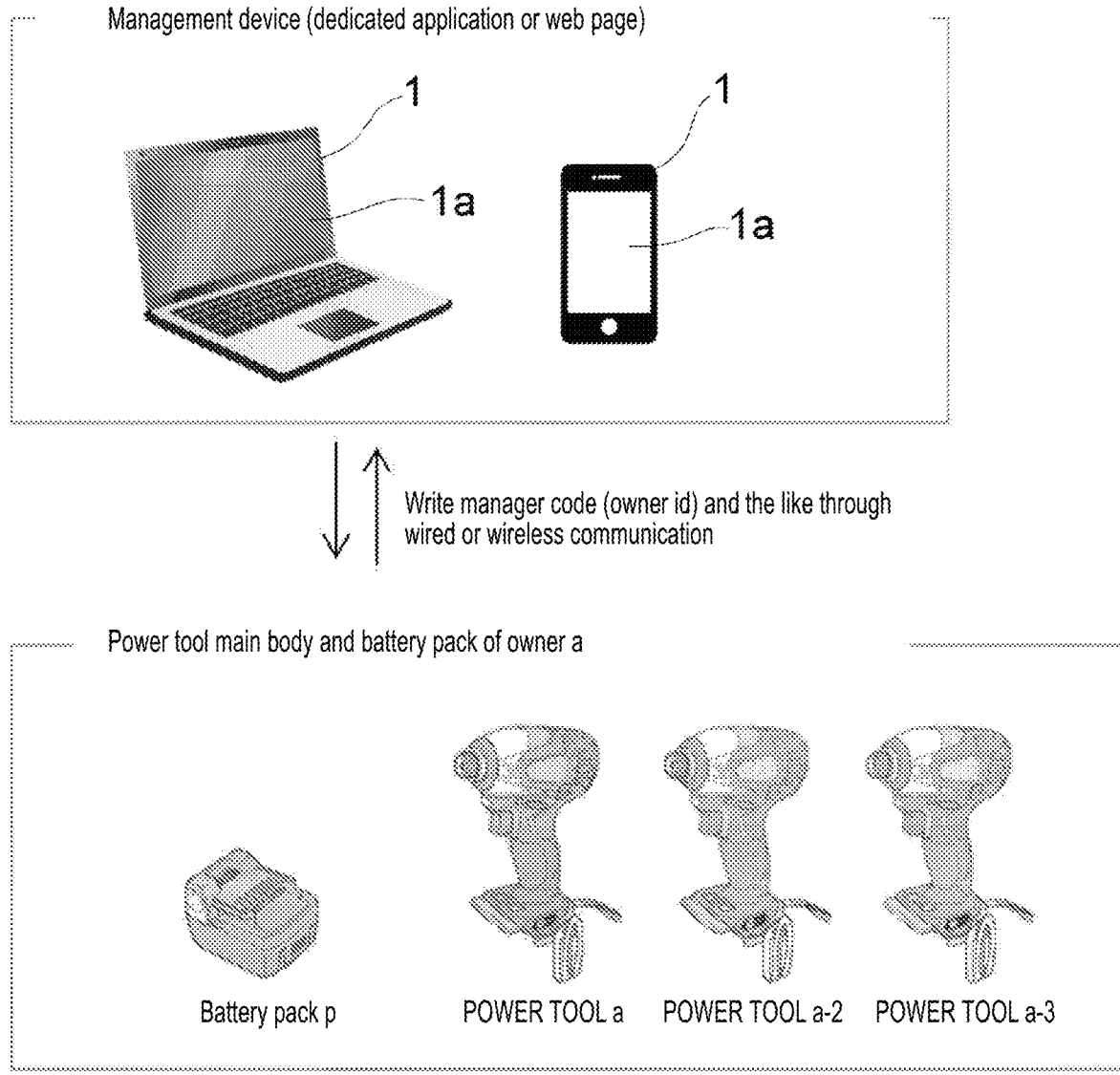
FIG. 1 is a conceptual diagram of a management system according to an embodiment of the present invention.
FIG. 2 is a table showing an example of an authentication code (ID) which is set for a battery pack P of FIG. 1.

Hereinafter, a preferred embodiment of the present invention will be described in detail with reference to the accompanying drawings. Meanwhile, the same or similar components, members, processes, and the like illustrated in the drawings are denoted by the same reference numerals and signs, and repeated description thereof will be omitted. In addition, the embodiment does not limit the invention and is merely an example, and not all features and combinations thereof described in the embodiment are necessarily essential to the invention.

FIG. 1 is a conceptual diagram of a management system according to an embodiment of the present invention. In this management system, a management device 1 is a general-purpose computer such as a personal computer or a smartphone, and includes an input means such as a keyboard or a touch panel, a screen (display means) 1a, a memory (storage means), a wired or wireless communication (transmission and reception) means, and a central processing unit (CPU) as a processing means (control means). A management program having a process, illustrated in FIG. 7 to be described later, described therein is stored in the memory. Communication using the communication means is, for example, wired communication using a Universal Serial Bus (USB) or the like or wireless communication such as Wi-Fi, Bluetooth (registered trademark), or Zigbee (registered trademark). In the example of FIG. 1, the management device 1 writes an authentication code in a battery pack P (corresponding to a battery pack 4 of FIG. 4) and tools a, a-2, and a-3 (corresponding to a power tool main body 3 of FIG.

4) of an owner A through wired or wireless communication. Each of the battery pack P and the tools a, a-2, and a-3 includes a memory (storage means) that stores the authentication code and a communication means that transmits and receives the authentication code.

FIG. 2 is a table illustrating an example of an authentication code (ID) which is set (written) for the battery pack P of FIG. 1. The authentication code includes a manager code (owner ID), a first use permission code (ID1), and a second use permission code (ID2). The manager code is an authentication code for specifying an owner. The first use permission code is an authentication code indicating an object for which use is permitted unconditionally. The second use permission code is an authentication code indicating an object for which use is permitted conditionally. In a case where use is permitted on the basis of the second use permission code, for example, at least one of a possible use time, a possible work number of times, a possible charge number of times, an allowable current, an allowable temperature, an allowable number of rotations, and an allowable torque is limited. Meanwhile, although illustration is omitted, an authentication code is also set (written) for each of the tools a, a-2, and a-3 of FIG. 1. Since all of the battery pack P and the tools a, a-2, and a-3 are owned by the owner A, they share a manager code thereof, but a first use permission code and a second use permission code can be set individually.

Figure 3:
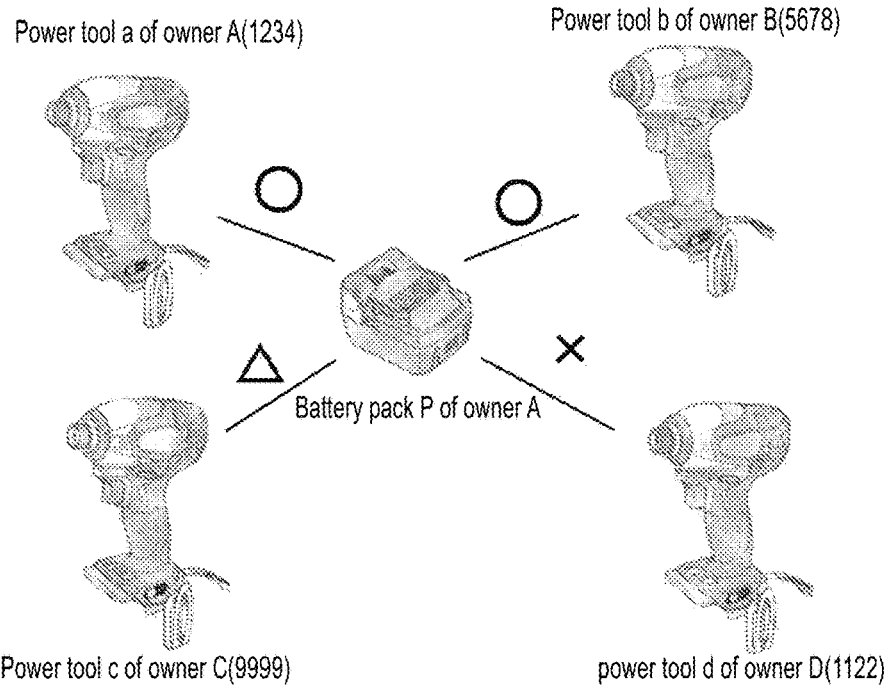
FIG. 3 is a conceptual diagram of authentication (user permission or non-permission) using authentication codes.

FIG. 3 is a conceptual diagram of authentication (user permission or non-permission) using authentication codes. Here, it is assumed that an authentication code is set for the battery pack P as illustrated in FIG. 2. Since the battery pack P of the owner A has a manager code "1234" which matches that of the tool a of the owner A, use is permitted unconditionally. Regarding the battery pack P, a manager code "5678" of a tool b of an owner B matches a first use permission code with respect to the tool b (corresponding to the power tool main body 3 of FIG. 4), and thus use is permitted unconditionally. Regarding the battery pack P, a manager code "9999" of a tool c of an owner C matches a second use permission code with respect to the tool c (corresponding to the power tool main body 3 of FIG. 4), and thus use is permitted conditionally. Regarding the battery pack P, a manager code "1122" of a tool d of an owner D does not match any authentication code with respect to the tool d (corresponding to the power tool main body 3 of FIG. 4), and thus use is not permitted.

Figure 4:
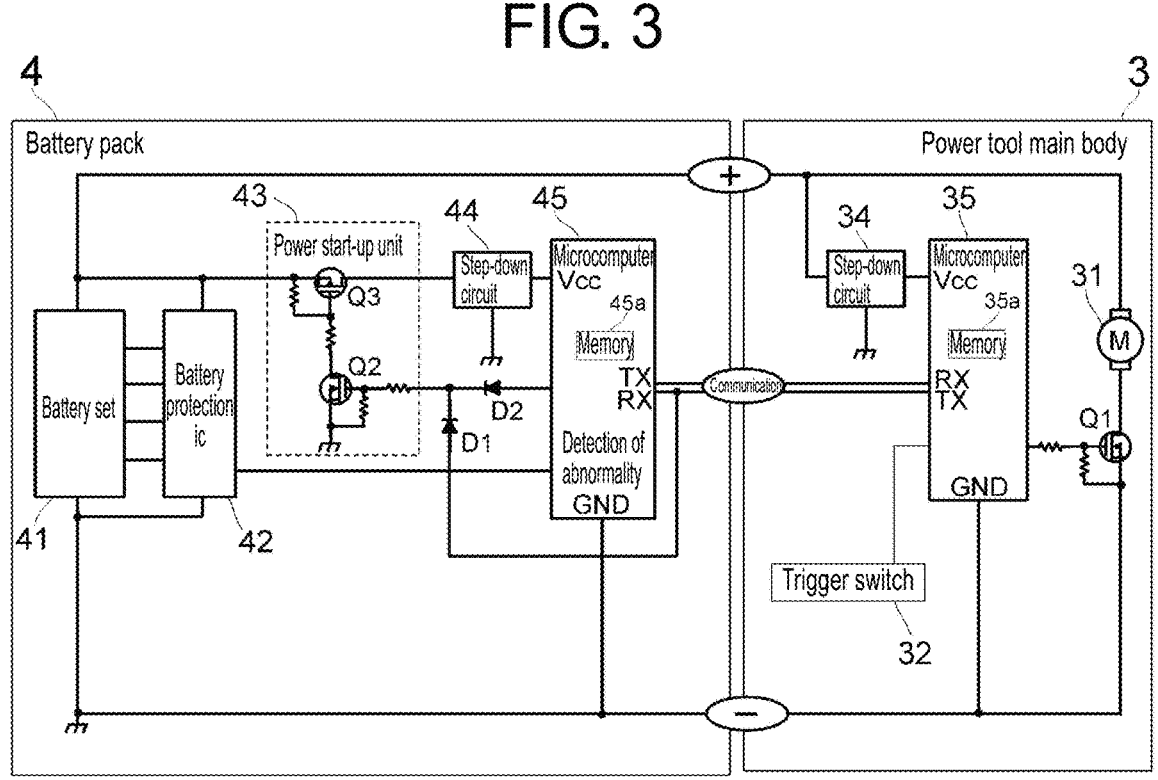
FIG. 4 is a circuit block diagram of a power tool 2 according to the embodiment of the present invention.

FIG. 4 is a circuit block diagram of the power tool 2 according to the embodiment of the present invention. The power tool main body 3 includes a motor 31, a trigger switch 32, a step-down circuit 34, and a microcomputer 35 as a control unit. The trigger switch 32 is an operation switch for a user to switch between driving and stop of the motor 31. The step-down circuit 34 is a power circuit that converts a voltage supplied from the battery pack 4 into an operation voltage Vcc (for example, DC 5 V) of the microcomputer 35. The microcomputer 35 has a built-in memory 35a as a storage means that stores an authentication code. The microcomputer 35 controls the driving and stop (electrical conduction, non-electrical conduction) by controlling the power of a switching element Q1 such as an FET or an IGBT connected to the motor 31 in series.

The battery pack 4 includes a battery set 41, a battery protection IC 42, a power start-up unit 43, a step-down circuit 44, and a microcomputer 45 as a control unit. The battery set 41 includes a plurality of secondary battery cells (for example, lithium-ion secondary battery cells) which are connected to each other in series or in parallel. The battery protection IC 42 is provided to protect the battery cells of the battery set 41 from overcurrent, overdischarge, abnormally high temperatures, and the like. The power start-up unit 43 is a circuit for starting up the step-down circuit 44. The step-down circuit 44 is a power circuit that converts a voltage supplied from the battery set 41 into an operation voltage Vcc (for example, DC 5 V) of the microcomputer 45. The microcomputer 45 has a built-in memory 45a as a storage means that stores an authentication code.

The power tool main body 3 and the battery pack 4 are connected to each other through a positive terminal, a negative terminal, and a communication terminal. When the battery pack 4 is connected to the power tool main body 3, power is supplied to the power tool main body 3. Specifically, a voltage is input to the step-down circuit 34 from the battery set 41 of the battery pack 4 through a positive terminal, the step-down circuit 34 steps down the input voltage and supplies the stepped-down voltage to the microcomputer 35, and the microcomputer 35 having received the voltage is started up. When the microcomputer 35 transmits a communication signal (start-up signal) to the battery pack 4 through the communication terminal, the communication signal is input to the power start-up unit 43 through a diode D1 within the battery pack 4, switching elements Q2 and Q3, such as an FET or an IGBT, of the power start-up unit 43 are sequentially turned on, a voltage is input to the step-down circuit 44 from the battery set 41, the step-down circuit 44 steps down the input voltage and supplies the stepped-down voltage to the microcomputer 45, and the microcomputer 45 having received the voltage is started up. The microcomputer 45 can control the power start-up unit 43 through a diode D2 to maintain the on state of the power start-up unit 43. In a case where a protection function of the battery protection IC 42 is operated (in a case where an abnormality is detected by the battery protection IC 42) and in a case where an unusable state (electrical conduction disabled state) is set through code authentication to be described later, the microcomputer 45 transmits a non-permission signal to the microcomputer 35 of the power tool main body 3 through the communication terminal. In a case where a non-permission signal is received from the microcomputer 45 of the battery pack 4 and in a case where an unusable state (electrical conduction disabled state) is set through code authentication to be described later, the microcomputer 35 of the power tool main body 3 turns off the switching element Q1 for motor driving and stops electrical conduction to the motor 31, independently of the operation of the trigger switch 32.

Figure 5:
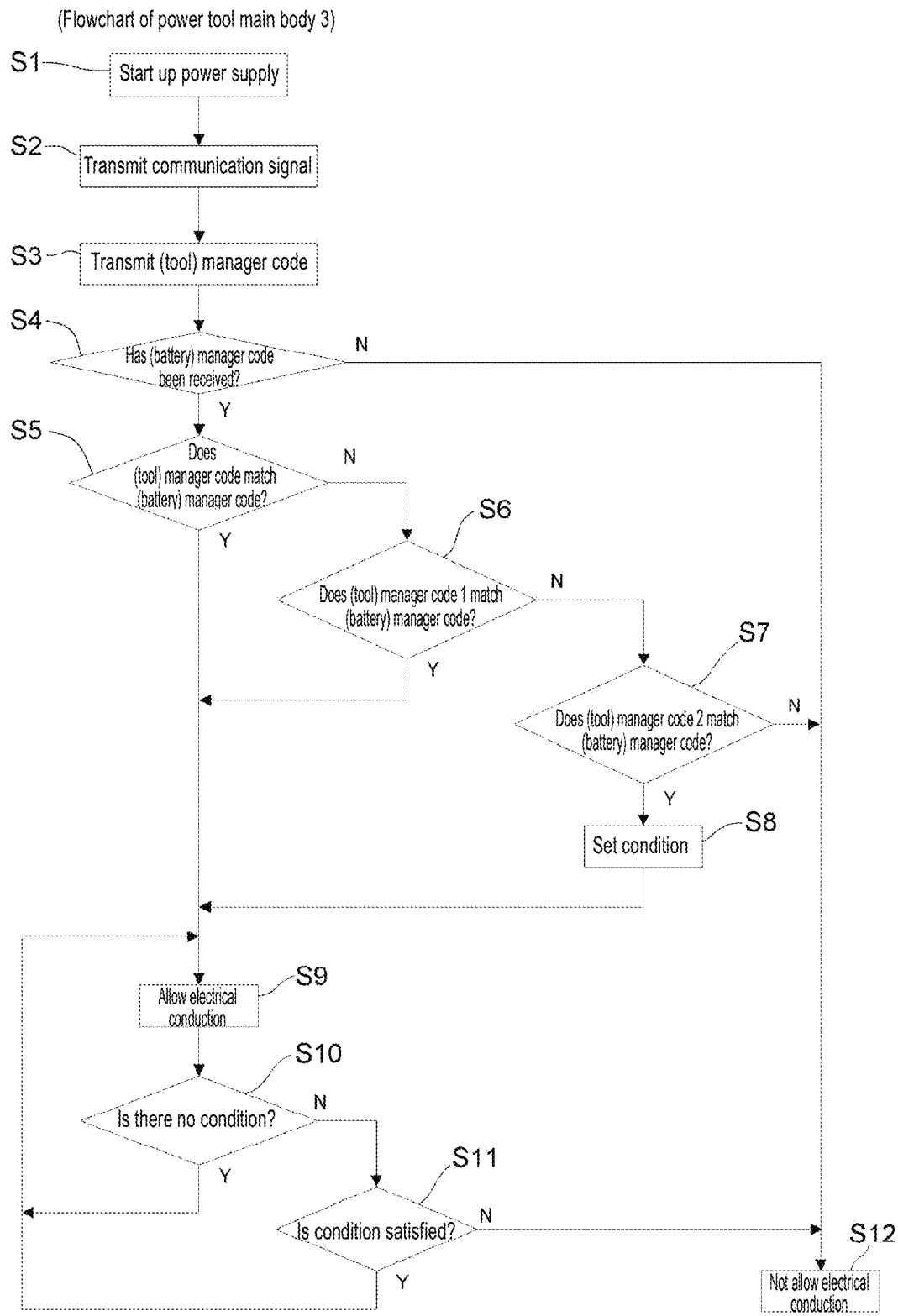
FIG. 5 is a flowchart illustrating an example of operations of a power tool main body 3 of FIG. 4.

FIG. 5 is a flowchart illustrating an example of operations of the power tool main body 3 of FIG. 4. When the battery pack 4 is mounted on the power tool main body 3, the microcomputer 35 of the power tool main body 3 is started up (S1). The microcomputer 35 transmits a communication signal for starting up the microcomputer 45 of the battery pack 4 to the battery pack 4 through the communication terminal (S2). Subsequently, the microcomputer 35 transmits a manager code of the power tool main body 3 to the microcomputer 45 of the battery pack 4 (S3).

When the microcomputer 35 receives the manager code of the battery pack 4 from the battery pack 4 (S4, Y), the microcomputer compares its own manager code with the manager code of the battery pack 4 (S5). When a result of the comparison in step S5 indicates consistency (S5, Y), the microcomputer 35 regards the manager of the power tool main body 3 and the manager of the battery pack 4 as being the same and permits electrical conduction from the battery pack 4 (S9). Specifically, when the trigger switch 32 of FIG.

4 is turned on, the microcomputer 35 turns on the switching element Q1 to set a state where electrical conduction to the motor 31 is allowed.

When a result of the comparison in step S5 indicates inconsistency (S5, N), the microcomputer 35 compares its own first use permission code with the manager code of the battery pack 4 (S6). When a result of the comparison in step S6 indicates consistency (S6, Y), the microcomputer 35 permits electrical conduction from the battery pack 4 (S9). When a result of the comparison in step S6 indicates inconsistency (S6, N), the microcomputer 35 compares its own second use permission code with the manager code of the battery pack 4 (S7). When a result of the comparison in step S7 indicates consistency (S7, Y), the microcomputer 35 sets a condition such as a possible use time, a possible work number of times, a possible charge number of times, an allowable current, an allowable temperature, an allowable number of rotations, or an allowable torque which is determined in advance for the second use permission code (S8) and permits electrical conduction from the battery pack 4 (S9).

When a condition is not set (S10, Y) after the permission of electrical conduction (S9), the microcomputer 35 continues the permission of electrical conduction (S9). When a condition is set (S10, N) after the permission of electrical conduction (S9), the microcomputer 35 continues the permission of electrical conduction (S9) as long as the condition is satisfied (S11, Y), and sets an electrical conduction disabled state (S12) in a case where the condition is not satisfied due to excess of a possible use time (S11, N). Specifically, the microcomputer 35 is set to be in a state where electrical conduction to the motor 31 is not allowed without turning on the switching element Q1 even when the trigger switch 32 of FIG. 4 is turned on.

In a case where the manager code of the battery pack 4 is not received in step S4 (S4, N) and a result of the comparison in step S7 indicates inconsistency (S7, N), the microcomputer 35 sets an electrical conduction disabled state (S12). Meanwhile, a case where the battery pack 4 does not have a function of storing the manager code and transmitting and receiving the manager code is conceivable as a reason why the manager code of the battery pack 4 is not received, and setting for permitting electrical conduction in such a case may be performed. In addition, the setting of an electrical conduction disabled state in step S12 may make actual work impossible by limiting a current to be applied to the motor 31 to an extremely low value.

Figure 6:
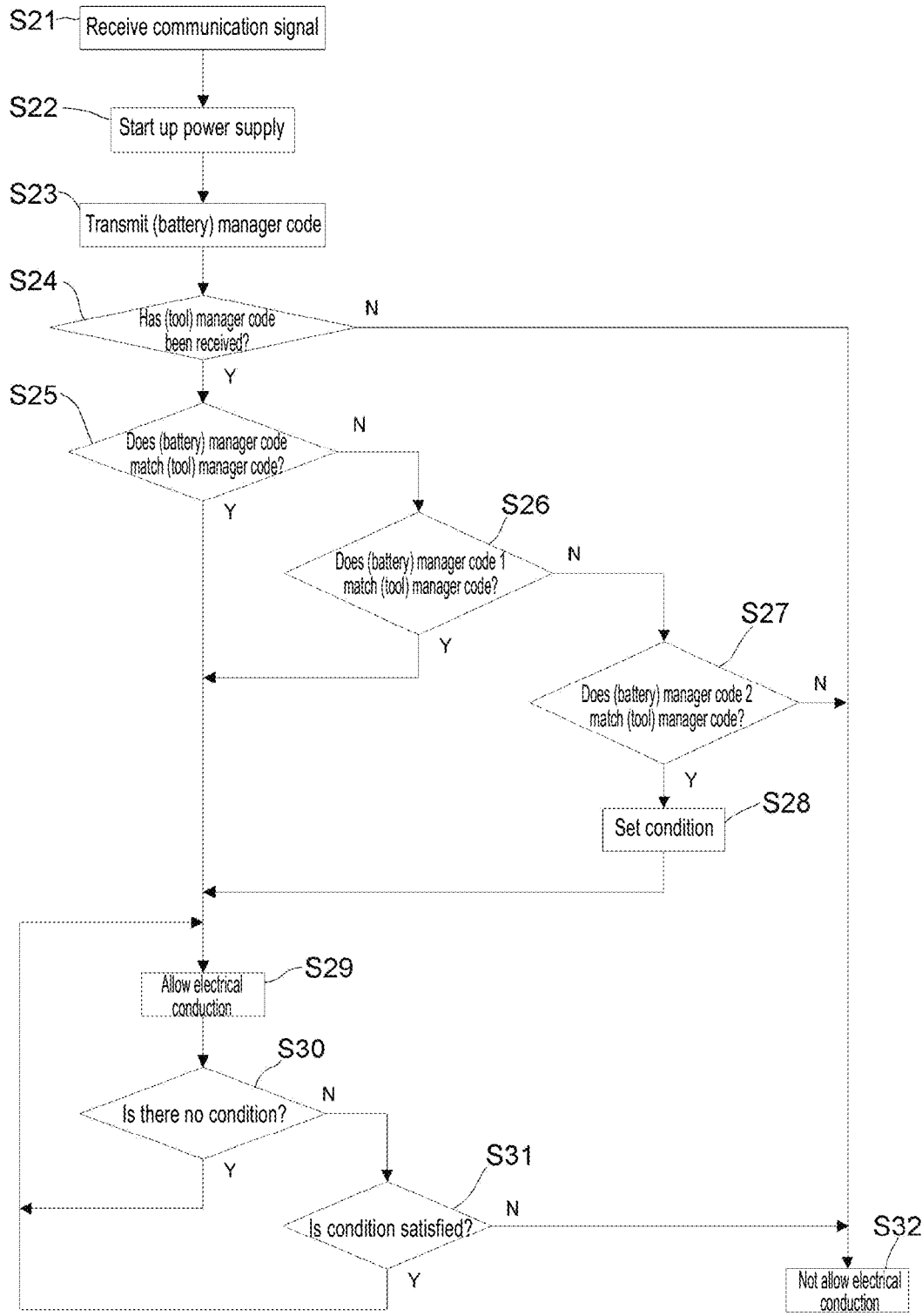
FIG. 6 is a flowchart illustrating an example of operations of a battery pack 4 of FIG. 4.

FIG. 6 is a flowchart illustrating an example of operations of the battery pack 4 of FIG. 4. When the battery pack 4 is mounted on the power tool main body 3, a communication signal is transmitted from the microcomputer 35 of the power tool main body 3 through the communication terminal, and the power start-up unit 43 receives the communication signal (S21). Then, power is input to the microcomputer 45 from the step-down circuit 44 in response to the start-up of the step-down circuit 44, and the microcomputer 45 is started up (S22). The microcomputer 45 transmits the manager code of the battery pack 4 to the microcomputer 35 of the power tool main body 3 (S23).

When the manager code of the power tool main body 3 is received from the power tool main body 3 (S24, Y), the microcomputer 45 compares its own manager code with the manager code of the power tool main body 3 (S25). When a result of the comparison in step S25 indicates consistency (S25, Y), the microcomputer 45 regards the manager of the power tool main body 3 and the manager of the battery pack 4 as being the same and permits electrical conduction to the power tool main body 3 (S29). Specifically, the microcomputer 45 transmits a permission signal to the microcomputer 35 of the power tool main body 3 through the communication terminal, and the microcomputer 35 having received the permission signal turns on the switching element Q1 when the trigger switch 32 of FIG. 4 is turned on, thereby setting a state where electrical conduction to the motor 31 is allowed.

When a result of the comparison in step S25 indicates inconsistency (S25, N), the microcomputer 45 compares its own first use permission code with the manager code of the power tool main body 3 (S26). When a result of the comparison in step S26 indicates consistency (S26, Y), the microcomputer 45 permits electrical conduction to the power tool main body 3 (S29). When a result of the comparison in step S26 indicates inconsistency (S26, N), the microcomputer 45 compares its own second use permission code with the manager code of the power tool main body 3 (S27). When a result of the comparison in step S27 indicates consistency (S27, Y), the microcomputer 45 sets a condition such as a possible use time, a possible work number of times, a possible charge number of times, an allowable current, an allowable temperature, an allowable number of rotations, or an allowable torque which is determined in advance for the second use permission code (S28) and permits electrical conduction to the power tool main body 3 (S29).

When a condition is not set (S30, Y) after the permission of electrical conduction (S29), the microcomputer 45 continues the permission of electrical conduction (S29). When a condition is set (S30, N) after the permission of electrical conduction (S29), the microcomputer 45 continues the permission of electrical conduction (S29) as long as the condition is satisfied (S31, Y), and sets an electrical conduction disabled state (S32) in a case where the condition is not satisfied due to excess of a possible use time (S31, N). Specifically, the microcomputer 45 transmits a non-permission signal to the microcomputer 35 of the power tool main body 3 through the communication terminal, and the microcomputer 35 having received the non-permission signal is set to be in a state where electrical conduction to the motor 31 is not allowed without turning on the switching element Q1 even when the trigger switch 32 of FIG. 4 is turned on.

In a case where the manager code of the power tool main body 3 is not received in step S24 (S24, N) and a result of the comparison in step S27 indicates inconsistency (S27, N), the microcomputer 45 sets an electrical conduction disabled state (S32). Meanwhile, a case where the power tool main body 3 does not have a function of storing the manager code and transmitting and receiving the manager code is conceivable as a reason why the manager code of the power tool main body 3 is not received, and setting for permitting electrical conduction in such a case may be performed. In addition, the setting of an electrical conduction disabled state in step S32 may make actual work impossible by limiting a current to be applied to the motor 31 to an extremely low value.

Figure 7:
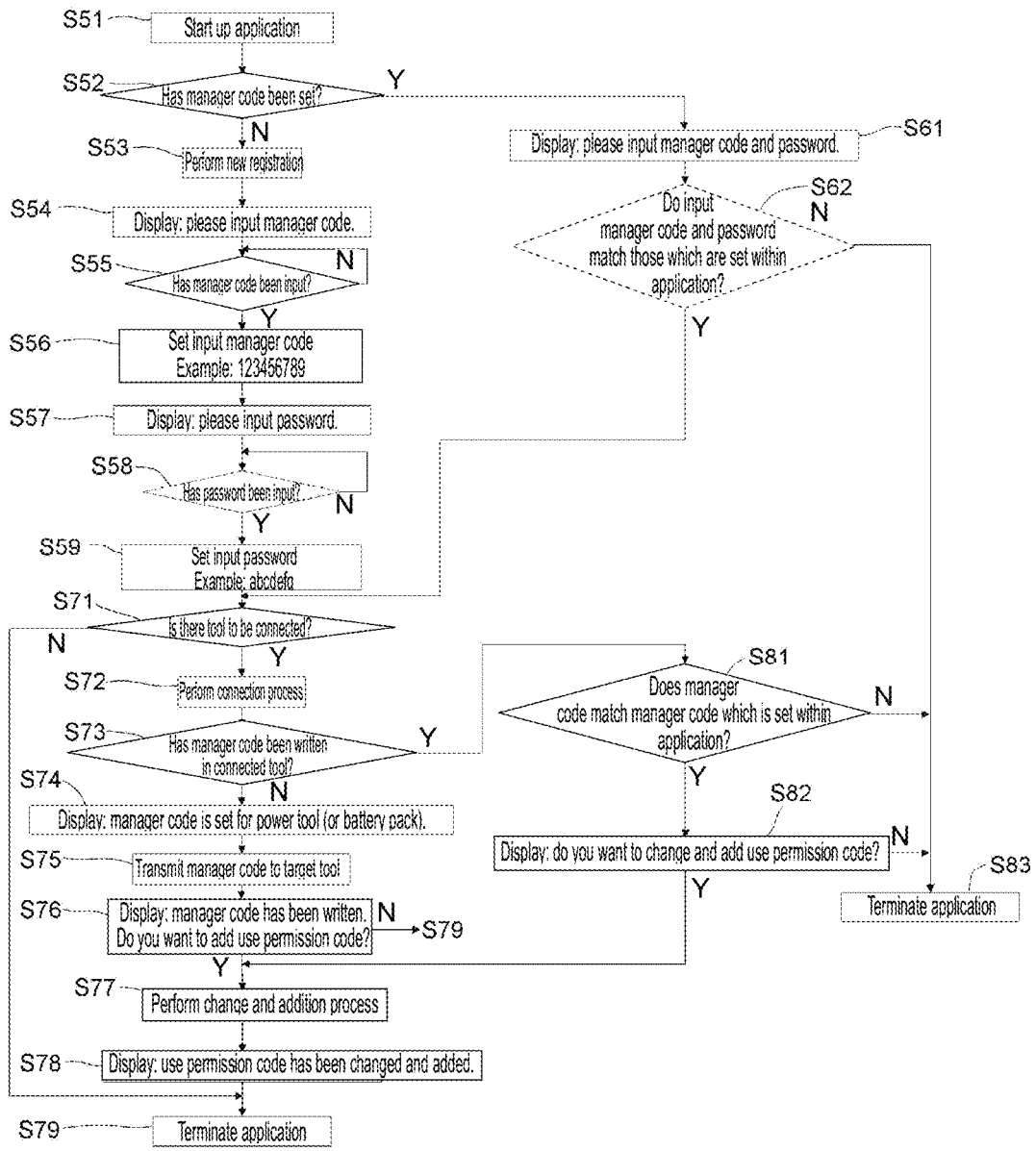
FIG. 7 is a flowchart illustrating an example of operations of a management device 1 of FIG. 1 at the time of code setting.

FIG. 7 is a flowchart illustrating an example of operations of the management device 1 of FIG. 1 at the time of code setting. This flowchart illustrates a process in which the CPU of the management device 1 executes a management program (management application) stored in the memory. Meanwhile, in the example of FIG. 1, a case where the management device 1 is a smartphone and wirelessly communicates with the power tool main body 3 and the battery pack 4 is assumed. The CPU starts up the management application in response to a user's start-up operation (S51).

When a manager code is not set for the management application (S52, N), the CPU registers a new manager code (S53). That is, the CPU performs screen display for prompting the user to input the manager code (S54), and sets the input manager code as a manager code of the management application (S56) when the manager code is input (S55, Y). Subsequently, the CPU performs screen display for prompting the input of a password (S57), and sets the input password as a password of the management application (S59) when the password is input (S58, Y).

The CPU searches for a tool to be connected (the power tool main body 3 or the battery pack 4) within a wireless communicable range, and performs a connection process (S72) when there is a tool to be connected (S71, Y). When a manager code is not written in the connected tool (S73, N), that is, a manager code is not received from the connected tool, the CPU determines that the tool is a new tool, performs screen display indicating that a manager code is set for the tool (S74), and transmits the manager code set for the management application to the tool (S75). When the writing of the manager code in the tool is completed, the CPU performs screen display indicating that the writing has been completed and performs screen display for selecting whether or not a use permission code is required to be added (S76). When an operation of selecting the addition of a use permission code is performed (S76, Y), the CPU receives an input of the use permission code from the user, performs a process of changing and adding the use permission code (S77), performs screen display indicating that the process has been completed (S78), and terminates the management application (S79).

Meanwhile, the use permission code includes the above-described first use permission code and second use permission code. In a case where the second use permission code is added, the setting of a condition such as a possible use time, a possible work number of times, a possible charge number of times, an allowable current, an allowable temperature, an allowable number of rotations, or an allowable torque for the second use permission code is also received (not shown). When there is no tool to be connected (S71, N) in step S71, the CPU terminates the management application (S79). When an operation for not requiring the addition of the use permission code is performed (S76, N), the CPU terminates the management application (S79).

In a case where the management application includes the setting of a manager code (S52, Y) in step S52, the CPU performs screen display for prompting the input of a manager code and a password which are examples of authentication information (S61). When the input manager code and password match the manager code and the password which are set for the management application (S62, Y), the CPU proceeds to step S71 described above. When the input manager code and password do not match the manager code and the password which are set for the management application (S62, N), the CPU terminates the management application (S83).

In a case where a manager code is written in the connected tool (S73, Y) in step S73, the CPU performs screen display for selecting whether or not a use permission code is required to be added (S82) when a manager code of the tool matches the manager code which is set for the management application (S81, Y), and receives an input of the use permission code from the user and performs a process of changing and adding the use permission code (S77) when an operation of selecting the addition of the use permission code is performed (S82, Y). When the manager code of the tool does not match the manager code which is set for the management application (S81, N), the CPU terminates the management application (S83). In this case, the CPU may perform a process for making the tool unusable. In this case, the unusable tool may be usable again through connection to a management application for which a manager code matching the manager code of the tool is set and a use restart process. When an operation for not requiring the addition of the use permission code is performed (S82, N), the CPU terminates the management application (S83).

In a case where there are two or more tools to be connected in step S71, the manager code which is set for the management application, the first use permission code, and the second use permission code can also be collectively transmitted to the plurality of tools, or setting can also be performed separately for each tool. In addition, setting for unconditionally or conditionally permitting electrical conduction may be able to be performed for a tool that does not have a function of storing, transmitting, and receiving a manager code. In addition, even when the manager code of the power tool main body 3 and the manager code of the battery pack 4 match each other, setting for conditionally permitting electrical conduction may be able to be performed.

In addition, the power tool main body 3 and the battery pack 4 may be provided with a display function using such as an LED, so that the user may be given a notice by turning on the LED or blinking the LED during connection to the management device 1. Further, the user may be notified by which authentication code, among the manager code, the first use permission code, and the second use permission code, authentication and operation are performed, for example, by changing the color of the LED. Further, in a case where electrical conduction is permitted conditionally, operation conditions until an electrical conduction disabled state is set may be displayed in the management application.

According to the present embodiment, the following effects can be exhibited.

(1) The owner of the power tool main body 3 and the battery pack 4 does not need to perform authentication through a portable terminal every time the power tool main body 3 and the battery pack 4 are used by registering his or her own manager code in the power tool main body 3 and the battery pack 4 in advance, which does not require time and effort as compared with the related art. In addition, it is also not necessary to carry a portable terminal to a work site for authentication, which provides convenience. Further, in a case where the manager code of the power tool main body 3 and the manager code of the battery pack 4 match each other, there is no effective time of authentication, which does not require time and effort as compared with the related art.

(2) In a case where the manager code of the battery pack 4 mounted on the power tool main body 3 matches none of the authentication codes stored in the power tool main body 3, the power tool main body 3 does not permit electrical conduction (electrical conduction to the motor 31) with respect to the battery pack 4 (does not permit using the power tool main body 3), and thus a third party having obtained the power tool main body 3 due to theft or the like cannot use the power tool main body 3 even when the battery pack 4 of the third party is mounted on the power tool main body 3 provided therein. Accordingly, a theft prevention effect is obtained.

(3) Similarly, in a case where the manager code of the power tool main body 3 which is a mounting destination matches none of the authentication codes stored in the battery pack 4, the battery pack 4 does not permit electrical conduction to the power tool main body 3 (does not permit using the battery pack 4), and thus a third party having obtained the battery pack 4 due to theft or the like cannot use the battery pack 4 (an operation using the power tool main body 3 cannot be performed) even when the battery pack 4 is mounted on the power tool main body 3 provided therein. Accordingly, a theft prevention effect is obtained.

(4) Since the authentication code includes the first use permission code for permitting unconditional use and the second use permission code for permitting unconditional use, the authentication code is convenient for lending and borrowing of the power tool main body 3 and the battery pack 4. Also in this case, authentication through a portable terminal is not necessary at a work site by registering the first use permission code and the second use permission code in the power tool main body 3 and the battery pack 4 in advance, which does not require time and effort as compared with the related art.

(5) Since a possible use time or the like can be limited for the permission of use using the second use permission code, it is convenient for management, for example, in a rental business.

(6) Since authentication codes of the power tool main body 3 and the battery pack 4 are set by the management device 1 which is an external device, it is possible to reduce a risk of rewriting an authentication code by a person other than the manager of the power tool main body 3 and the battery pack 4. Specifically, since it is necessary to input authentication information (for example, a manager code and a password) to the management device 1 in order to rewrite the authentication codes of the power tool main body 3 and the battery pack 4 and the authentication codes cannot be rewritten when a manager code specified by the input authentication information does not match the manager codes of the power tool main body 3 and the battery pack 4, a third party having obtained the power tool main body 3 or the battery pack 4 due to theft or the like cannot rewrite the authentication code of the power tool main body 3 or the battery pack 4, and thus a theft prevention effect is obtained. Further, when the power tool main body 3 or the battery pack 4 is made unusable in a case where the manager code specified by the input authentication information does not match the manager code of the power tool main body 3 or the battery pack 4, a theft prevention effect is further obtained.

Figure 8:
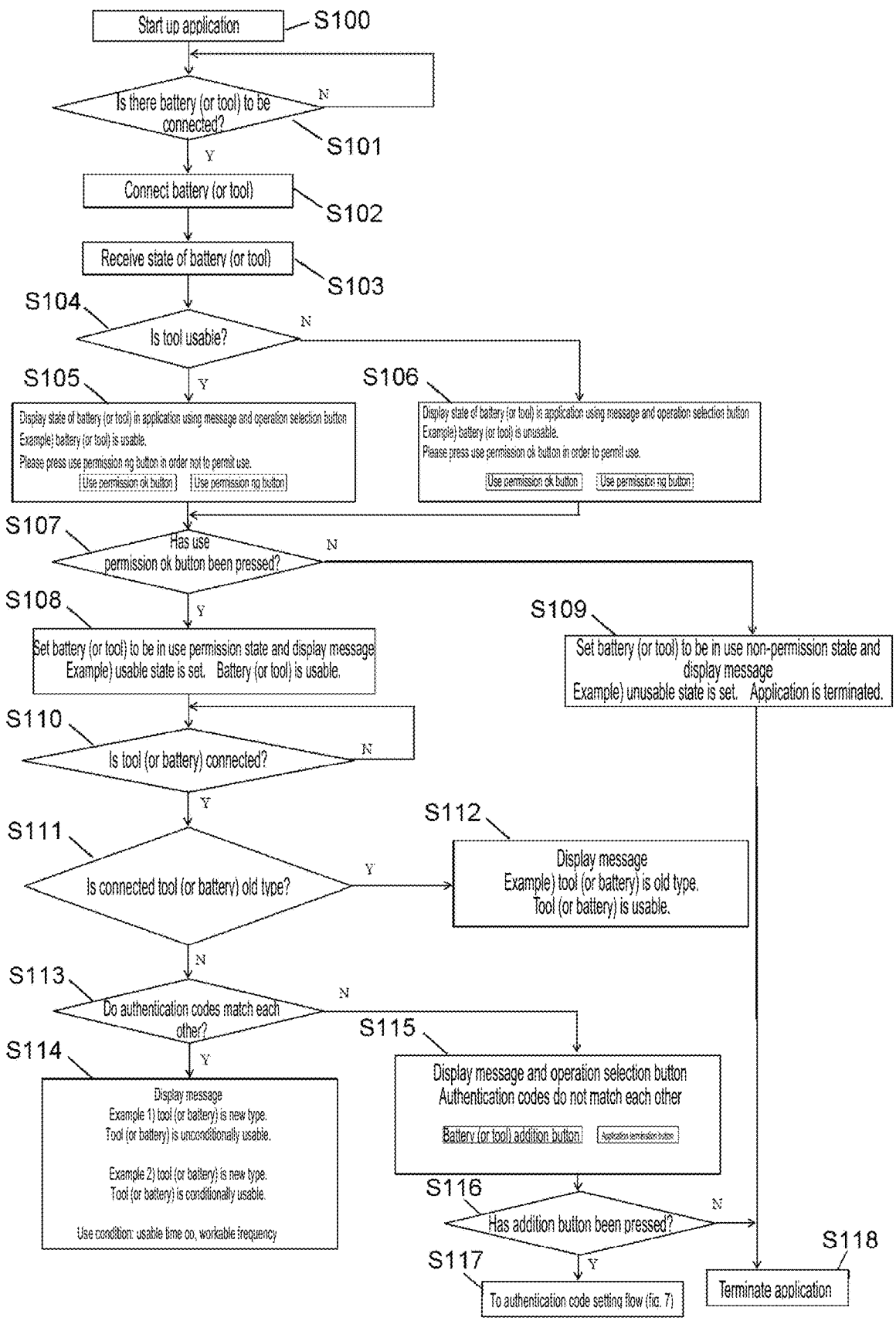
FIG. 8 is a flowchart illustrating an example of operations of the management device 1 of FIG. 1 at the time of state monitoring.

FIG. 8 is a flowchart illustrating an example of operations of the management device 1 of FIG. 1 at the time of state monitoring. In this flowchart, results of authentication of the mutual authentication codes through communication between the power tool main body 3 and the battery pack 4 (for example, wireless communication) are displayed on a display unit 1a of the management device 1 (for example, a portable terminal such as a smartphone) such that an authentication state is monitored.

The CPU of the management device 1 starts up a management application in response to a user's start-up operation (S100). The management device 1 (CPU) searches for a tool to be connected (the power tool main body 3 or the battery pack 4) within a wireless communicable range, and performs a connection process (S102) when there is a tool to be connected (S101, Y). Meanwhile, description has been given on the assumption that the connected tool is the battery pack 4 as an example, but the power tool main body 3 or both of them may be connected. The management device 1 receives a state signal from the connected tool (S103). Here, the state signal is a signal indicating whether or not the use of the tool to be connected can be permitted. For example, whether or not the use of the tool was permitted in the past (at the time of previous use) is stored in the memory 45a of the tool (the memory 35a in a case where the connected tool is the power tool main body 3), and the stored information is received as a state signal. For example, when a use permission OK button is operated in steps S105 and S106 to be described later, the setting of a use permission OK state is stored in the memory 45a as a state signal. On the other hand, when a use permission NG button is operated in steps S105 and S106, the setting of a use permission NG state is stored in the memory 45a as a state signal. In addition, the state signal may be set to be an authentication code of the battery pack 4 serving as an object to be connected to the management device 1 (an authentication code of the power tool main body 3). Here, the process of step S103 and the subsequent processes may be performed even when a manager code of the tool does not match the manager code which is set for the management application (even when the tool does not have a manager code). Alternatively, although not shown in the drawing, in a case where the manager code of the tool matches the manager code which is set for the management application (a manager code specified by authentication information input to the management application) (corresponding to Y of S81 in FIG. 7), the subsequent processes may be performed. In the former case, an old type to be described later can be used, and thus usability can be improved. In the latter case, use can be limited to only a new type to be described later, and thus a theft prevention suppression effect can be obtained.

The management device 1 determines whether or not the tool can be used, on the basis of the state signal received from the tool to be connected (battery pack 4) (S104). Meanwhile, the state signal may be set to be an authentication code. In this case, it is determined whether or not the authentication code stored in the storage unit (not shown) of the management device 1, that is, the authentication code registered by the management device 1 in the past and the authentication code received from the tool match each other (whether or not the authentication code is stored in the management device 1).

The management device 1 displays that the tool can be used on the display unit 1a when it is determined that the tool can be used (S104, Y), and displays a message for prompting the user to operate the use permission NG button (S105) in a case where the user does not arbitrarily permit the use of the tool. The management device 1 is provided with an operation selection button (the use permission OK button and the use permission NG button) for the user to arbitrarily select whether or not the tool can be used. Here, when the management device 1 is a portable terminal such as a smartphone, the operation selection button can be provided in the display unit 1a as a touch panel, but the operation selection button may be provided outside the display unit 1a.

On the other hand, when it is determined that the tool cannot be used (S104, N), the management device 1 displays that the tool cannot be used on the display unit 1a. Similarly to S105, the management device displays a message for prompting the user to operate the use permission button in a case where an operation selection button is provided and the user can arbitrarily permit the use of the tool (S106).

When the use permission OK button is operated (S107, Y), a message indicating that the tool can be used is displayed on the display unit 1a (S108). On the other hand, when the use permission NG button is operated (S107, N), a message indicating that the tool cannot be used is displayed on the display unit 1a and a message indicating that the application is terminated is displayed (S109) to terminate the application (S118). Meanwhile, in a case where the operation selection button is not operated for a predetermined time in step S107, a message indicating that the tool can be used may be displayed in S108 in a case where the tool can be used in an initial state (S105), a message indicating that the tool cannot be used may be displayed in step S109 in a case where the tool cannot be used in an initial state (S106).

In a state where the tool to be connected (battery pack 4) can be used, the management device 1 determines whether or not the power tool main body 3 has been connected to the battery pack 4 (S110). This determination is performed by receiving a connection signal indicating that the power tool main body 3 has been connected to the battery pack 4 from either one or both of the battery pack 4 and the power tool main body 3. In a case where the power tool main body 3 is not connected (the connection signal is not received) (S110, N), the reception of the connection signal is waited for. In a case where the power tool main body 3 is connected (the connection signal is received) (S110, Y), it is determined whether or not the connected power tool main body 3 is a first power tool main body (new type main body) which has a communication function or a second power tool main body (old type main body) which does not have a communication function (S111). Meanwhile, in a case of the second power tool main body, the power tool main body 3 cannot transmit the connection signal, but the connected battery pack 4 can transmit the connection signal to the management device 1, and thus the management device 1 can determine a connection state between the battery pack 4 and the power tool main body 3. In addition, even when the power tool main body 3 is set to be a tool to be connected in steps S100 to S109 and the battery pack 4 is either a first battery pack (new type battery) which has a communication function or a second battery pack (old type battery) which does not have a communication function, it is possible to determine a connection state between the power tool main body 3 and the battery pack 4 by the power tool main body 3 transmitting the connection signal to the management device 1.

In a case where the connected power tool main body 3 is an old type main body that does not have a communication function (S111, Y), the management device 1 permits the use of the power tool main body 3 and displays a message indicating that the power tool main body 3 is an old type and is usable on the display unit 1a (S112). Meanwhile, when an old type main body can be used, an operation selection button may be provided so that no use condition or with use condition can be selected, and a use condition may be able to be set in a case where with use condition is selected. Meanwhile, in a case where the old type main body is connected to the battery pack 4, an unusable state may be set at all times, which may be set by the user (manager) depending on whether usability is prioritized or a theft suppression effect is prioritized.

In a case where the connected power tool main body 3 is a new type main body having a communication function (S111, N), authentication operations of the power tool main body 3 and the battery pack 4 are executed (S113). In the authentication operations, the processes of steps S5 to S8 of FIG. 5 and the processes of steps S25 to S28 of FIG. 6 are performed between the power tool main body 3 and the battery pack 4, and results of the authentication operations are received by the management device 1 as an authentication signal.

In a case where an authentication signal indicating that authentication codes match each other is received (S113, Y), a message indicating that the power tool main body 3 is a new type and is usable is displayed on the display unit 1a (S114). Here, the authentication signal indicating that authentication codes match each other includes a case where there is no use condition (Y in steps S5 and S6 of FIG. 5 and Y in steps S25 and S26 of FIG. 6) and a case where there is a use condition (Y in step S7 of FIG. 5 and Y in step S27 of FIG. 6), and thus a message indicating that there is no use condition or a message indicating that there is a use condition and the use condition may be displayed on the display unit 1a in accordance with the authentication signal in step S114. In addition, the authentication operations may be executed by the management device 1. In this case, the management device 1 may receive the authentication codes from the battery pack 4 and the power tool main body 3 and may perform the same processes as those in FIGS. 5 and 6.

In a case where an authentication signal indicating that the authentication codes do not match each other is received (S113, N), a message indicating the authentication codes do not match each other and an operation selection button (an addition button, an application termination button) for the user to select whether the authentication code of the battery pack 4 (or the power tool main body 3) is newly registered or the application is terminated is displayed (S115).

In a case where the addition button is operated (S116, Y), a process of registering the authentication code illustrated in FIG. 7 is performed (S117). When the application termination button is operated (S116, N), the application is terminated (S118).

As described above, the state of the connected tool is displayed on the display unit 1a of the management device 1, and thus the user can easily ascertain the state of the tool and work efficiency can be improved. In particular, when the management device 1 is set to be a portable terminal such as a smartphone, the management device can be easily carried by the user and thus does not disturb work. In addition, the user can arbitrarily select permission of use and non-permission of use. Thus, when the tool connected to the management device 1 is not permitted to be used, the battery pack 4 and the power tool main body 3 cannot be used even when a user other than an owner or a manager attempts to use them in spite of the battery pack 4 and the power tool main body 3 being disposed at a work location in a connected state, and thus an effect of suppressing theft is obtained.

In addition, an effect of suppressing theft is also obtained by attaching a mark such as a seal with a theft prevention function or the like to a location seen by the user such as the housing of the power tool main body 3 or the battery pack 4.

In addition, a message is displayed on the display unit 1a of the management device 1. However, in a case where the battery pack 4 is provided with a remaining amount display unit or in a case where the power tool main body 3 is provided with a function for giving a notice to the user such as an LED light, a remaining amount display unit of a battery pack, or a driving mode display unit, a state may be displayed using those notification functions, or a notice may be given using a sound. The remaining amount display unit, the LED light, and the driving mode display unit are equivalent to display units.

Figures 9, 10:
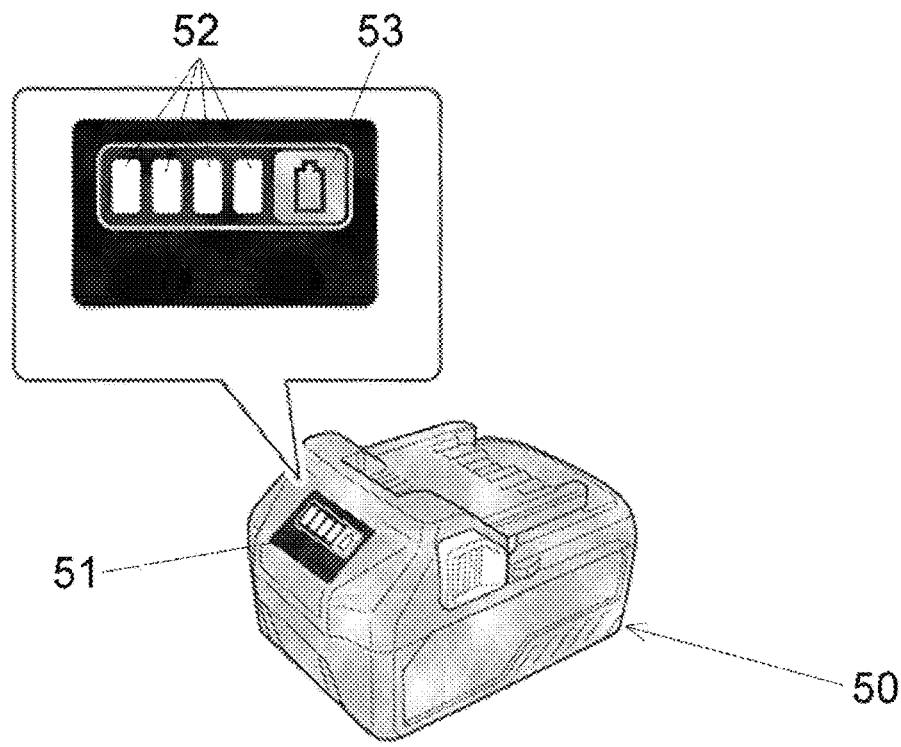
FIG. 9 is a perspective view of a battery pack 50 as a power device.
FIG. 10 is a diagram illustrating an example of the display of a remaining amount display unit 52 of FIG. 9 showing a remaining amount and a communication result of the battery pack 50.

For example, a battery pack 50 as a power device illustrated in FIG. 9 includes a switch panel 51 at a portion facing above a rear outer surface of a housing constituting an outer frame of the battery pack 50, in addition to having the same configuration as the battery pack 4 illustrated in FIG. 4. The switch panel 51 is provided with a remaining amount display unit 52 and a remaining amount display switch 53. The remaining amount display unit 52, which is constituted by four LEDs here, displays a remaining amount of the battery pack 50 and functions as a state notification unit that gives a notice of a result of communication (authentication result) with the management device 1. The remaining amount display switch 53 is a switch (here, a button switch) for the user to switch whether to perform display on the remaining amount display unit 52 and to switch between the display of a remaining amount and the display of a communication result.

FIG. 10 is a diagram illustrating an example of the display of the remaining amount display unit 52 of FIG. 9 showing a remaining amount and a communication result of the battery pack 50. In the remaining amount display unit 52, four LEDs are turned on together in a case of full charging of the battery pack 50, the number of LEDs being turned on is reduced in a stepwise manner as a remaining amount of the battery pack 50 decreases, and one LED blinks when the remaining amount is zero, under the control of the control unit. On the other hand, when the battery pack 50 is in a usable state (equivalent to steps S105 and S108 of FIG. 8) as a result of communication with the management device 1 and reception of a communication result from the management device 1, the control unit of the battery pack 50 blinks the four LEDs of the remaining amount display unit 52. When the battery pack 50 is in an unusable state (equivalent to steps S106 and S109 of FIG. 8), the control unit blinks two LEDs at both ends among the four LEDs of the remaining amount display unit 52. The display of a remaining amount and the display of a communication result may be switched whenever the remaining amount display switch 53 is operated or may be automatically switched when the battery pack 50 receives a communication result from the management device 1, and the number of LEDs blinking, a blinking method, and a display switching method are not limited thereto.

In addition, when the power tool main body is connected to the battery pack 50, the management device 1 performs the process of step S111 of FIG. 8 and the subsequent processes. Here, a case where the power tool main body has a notification function will be described.

Figures 11, 12:
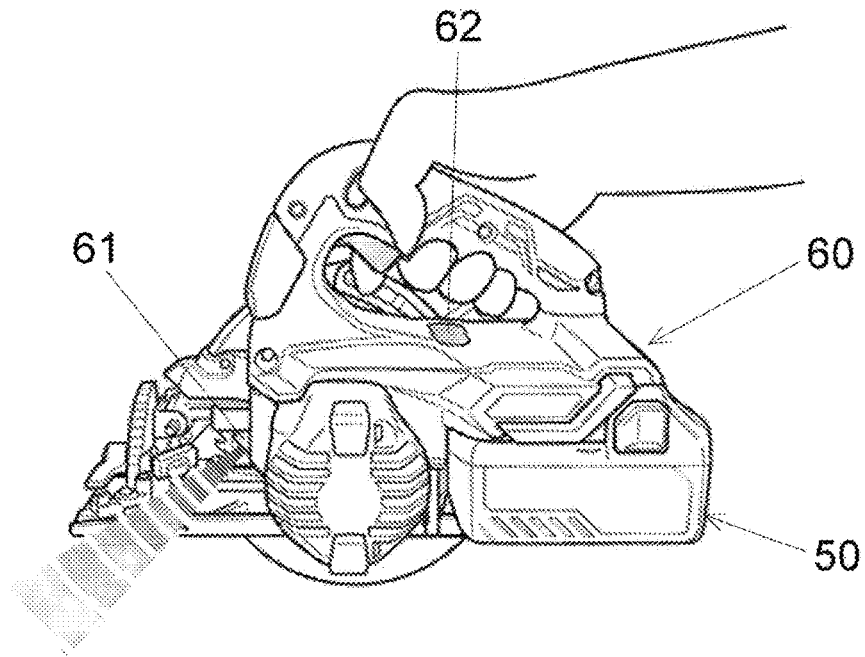
FIG. 11 is a side view of a portable circular saw main body 60 as a power tool main body.
FIG. 12 is a table showing a usable state and an unusable state in a case where an electric device and a power device are an old type and a new type, respectively.

A portable circular saw main body 60 as a power tool main body illustrated in FIG. 11 is provided with an LED light 61 that illuminates a work material. In addition, a switch panel 62 illustrated in FIG. 11 is provided on an upper surface of the circular saw main body 60. The switch panel 62 is provided with a light turn-on switch and a lighting state display LED not shown in the drawing. The light turn-on switch is a switch (here, a button switch) which is operated for the user to give an instruction for turning on or turning off the LED light 61 and to use the LED light 61 as a state display unit of a tool. Switching between turn-on, turn-off, and state display is performed in this order every time the light turn-on switch is operated. Meanwhile, switching to a state display function may be automatically performed when communicating with the management device 1. A lighting state or a blinking state of the lighting state display LED is notified to the user by being switched depending on whether the LED light 61 is used as an ordinary irradiation light or is used as a state display unit of a tool.

In step S110 of FIG. 8, in a case where the battery pack 50 and the circular saw main body 60 are connected to each other and the connected circular saw main body 60 is an old type main body (S111, Y), the remaining amount display unit 52 of the battery pack 50 displays that the circular saw main body 60 is an old type main body due to the circular saw main body 60 not having a communication function. For example, two LEDs of the four LEDs are blinked every other one. Meanwhile, the LED light 61 of the circular saw main body 60 may be controlled by the control unit of the battery pack 50.

In a case where the circular saw main body 60 is a new type main body (S111, N) and the authentication codes match each other (S113, Y), the control unit (equivalent to the microcomputer 35 of FIG. 3) of the circular saw main body 60 controls the LED light 61 so as to be in a first state (equivalent to S114 of FIG. 8). On the other hand, in a case where the authentication codes do not match each other (S113, N), the control unit of the circular saw main body 60 controls the LED light 61 so as to be in a second state (equivalent to S115 of FIG. 8). For example, a notice is given to the user by setting the LED light 61 so as to perform high-speed blinking display (for example, turn-on and turn-off of the LED light are repeatedly performed every 0.1 seconds) in a case where the authentication codes match each other and there is no use condition and by setting the LED light 61 so as to perform low-speed blinking display (for example, turn-on and turn-off of the LED light are repeatedly performed every 0.5 seconds) in a case where the authentication codes match each other and there is a use condition. Further, in a case where the authentication codes do not match each other, the LED light 61 is set to perform lower-speed blinking display (for example, the turn-on and turn-off of the LED light are repeatedly performed every 1 second). A notice of an authentication result may be given to the user in a case where the light turn-on switch is pressed or may be automatically given to the user when communication with the management device 1 is executed regardless of whether or not the light turn-on switch is pressed. In addition, the authentication result may be displayed on the remaining amount display unit 52 of the battery pack 50 instead of the LED light 61 of the circular saw main body 60, or may be notified using a sound. Meanwhile, the display of the processes of steps S101 to 109 of FIG. 8 may be performed on the tool main body side, and the display of the process of step S110 and the subsequent processes may be performed on the battery pack side. In this case, a power supply may be provided inside the circular saw main body 60 so that the control unit and the LED light 51 can be operated even when the power device is not connected to the circular saw main body 60.

According to such a configuration, since a communication (authentication) result can be displayed by the power tool main body and the battery pack, time and effort for confirming the display unit of the management device 1 can be saved, and thus usability can be improved.

In addition, description has been given of an example in which a power tool (main body) is used as the electric device and a battery pack directly detachable from a device main body is used as the power device, but the invention is not limited thereto. An electric device, such as a light, a radio, or a television, which does not include a motor as a load portion may be used as the electric device, and a backpack-type power supply carried by the user or a power supply used by being hooked on the user's belt or the like may be used as the power device. In this case, a connection cord is connected to the power supply, and the power supply may be configured to be detachable from the device main body by an adapter provided on the other end side of the connection cord. Since the power supply is provided separately from the device main body, it is possible to reduce the weight of the electric device as compared with a case where a battery pack to be directly connected to a device main body is used.

From the above, a relationship between the electric device and the power device is as illustrated in FIG. 12. In a case where both the electric device and the power device are new types, a usable state or an unusable state is determined depending on an authentication code. On the other hand, description has been given in the above-described example on the assumption that a usable state is set in a case where either of them is an old type, but the user may set in advance whether to set a usable state or a use prohibition state. In addition, when setting can be performed so that an authentication process for an authentication code does not function in spite of both of them being new types and the user invalidates the authentication function using the management device or the like to prohibit the use of both the electric device main body and the power device (cannot be driven) after work is terminated, it is also possible to obtain an effect of suppressing theft in a state where the electric device main body and the power device are disposed at a work site.

While the present invention has been described by taking the embodiment as an example, those skilled in the art can understand that various modifications can be made to each component and each processing process in the embodiment within the scope of claims.

For example, in a case where it is not possible to log in to a management application, a manager may be specified from a serial number of the power tool main body 3 or the battery pack 4, and positional information for logging in to an e-mail address registered in advance by the manager may be transmitted.

Specifically, first, the user starts up the management application by the management device 1 (smartphone). In this case, the management device 1 may be set such that positional information can be ascertained. Thereafter, the power tool main body 3 or the battery pack 4 is connected (communication is performed). At the time of this connection, a unique ID of the power tool main body 3 or the battery pack 4 is acquired in addition to a manager code. Further, logging-in to the management application is not successful, a manager is specified from the acquired unique ID, and positional information is transmitted to a designated e-mail address registered in advance. With such a configuration, in a case where the power tool main body 3 or the battery pack 4 is stolen, a location of the theft can be specified.

The invention claimed is:

1. A power device adapted to be selectively connected to one of a first electric device main body, a second electric device main body and a third electric device main body, the power device comprising:
   a first storage portion, comprising a memory, for storing at least a first power device authentication code and a second power device authentication code, and
   a first communication portion, comprising a transmitter and a receiver, for transmitting and receiving an authentication code of the connected electric device main body,
   wherein the first electric device main body stores a first main body authentication code, the second electric device main body stores a second main body authentication code different from the first main body authentication code, and the third electric device main body stores a third main body authentication code different from the first and second main body authentication codes,
   wherein when the power device is connected to one of the first and second electric device main bodies, the power device is configured to be able to allow an electrical conduction to the connected electric device main body when one of the first and second main body authentication codes received via the first communication portion from the connected electric device main body corresponds to one of the first and second power device authentication codes, and
   wherein when the power device is connected to the third electric device main body, the power device is configured to set an electrical conduction to a disabled state when the third main body authentication code received via the first communication portion from the connected electric device main body does not correspond to one of the first and second power device authentication codes.

2. The power device according to claim 1, wherein,
   when the first power device authentication code matches one of the first and second main body authentication codes received via the first communication portion, the power device is configured to be able to operate the connected electric device main body under a first operation condition, and
   when the second power device authentication code matches the other of the first and second main body authentication codes received via the first communication portion, the power device is configured to be able to operate the connected electric device main body under a second operation condition different from the first operation condition.

3. The power device according to claim 2, wherein the first operation condition does not limit a use of one of the first electric device main body and the second electric device main body, and
   the second operation condition limits a use of the other of the first electric device main body and the second electric device main body.

4. An electric device main body adapted to be selectively connected to one of a first power device, a second power device and a third power device, the electric device main body comprising:
   a storage portion, comprising a memory, for storing at least a first main body authentication code and a second main body authentication code, and
   a communication portion, comprising a transmitter and a receiver, for transmitting and receiving an authentication code of the connected power device,
   wherein the first power device stores a first power device authentication code, the second power device stores a second power device authentication code different from the first power device authentication code, and the third power device stores a third power device authentication code different from the first and second power device authentication codes,
   wherein when the electric device main body is connected to one of the first and second power devices, the electric device main body is configured to be able to allow an electrical conduction from the connected power device when one of the first and second power device authentication codes received via the communication portion from the connected power device corresponds to one of the first and second main body authentication codes, and
   wherein when the power device is connected to the third electric device main body, the electric device main body is configured to set an electrical conduction to a disabled state when the third power device authentication code received via the communication portion from the connected power device does not corresponded to one of the first and second main body authentication codes.

5. The electric device main body according to claim 4, wherein,
when the first main body authentication code matches one of the first and second power device authentication codes received via the communication portion, the electric device main body is configured to be able to operate under a first operation condition, and
when the second main body authentication code matches the other of the first and second power device authentication codes received via the communication portion, the electric device main body is configured to be able to operate under a second operation condition different from the first operation condition.

6. The electric device main body according to claim 5, wherein the first operation condition does not limit a use of one of the first electric device main body and the second electric device main body, and
the second operation condition limits a use of the other of the first electric device main body and the second electric device main body.

7. The electric device main body according to claim 6, wherein, use is permitted in a case where the power device authentication code received by the communication portion matches at least one of the first and second main body authentication codes stored in the storage portion, and use is not permitted in a case where the power device authentication code does not match any of the main body authentication codes; and
wherein the first main body authentication code is a first use permission code to permit unconditional use that does not limit a use of the connected electric device, and the second main body authentication code is a second use permission code to permit conditional use that limits a use of the connected electric device.

8. The electric device main body according to claim 4, wherein the storage portion stores a manager code, and the first main body authentication code received by the communication portion is a manager code.

9. The electric device main body according to claim 7, wherein, in a case where use is permitted on the basis of the second use permission code, at least any one of a possible use time, a possible work number of times, a possible charge number of times, an allowable current, an allowable temperature, an allowable number of rotations, and an allowable torque is limited.

10. The electric device main body according to claim 4, wherein the first and second main body authentication codes are set by an external device.

11. The electric device main body according to claim 4, wherein any one of the electric device main body and the power device includes a display unit that displays an authentication result of the authentication code.

12. The electric device main body according to claim 11, wherein a configuration that enables an operator to arbitrarily select a usable state or an unusable state in accordance with the authentication result displayed on the display unit is adopted.

13. The electric device main body according to claim 4, wherein at least any one of the electric device main body and the power device is configured such that setting indicating non-permission of use is able to be performed by an external device.

14. An electric device system comprising:
the electric device main body according to claim 4; and
a management device which is able to communicate with at least one of the electric device main body and the power device,
wherein the management device includes a display unit that displays the authentication result of the authentication code.

15. The electric device system according to claim 14, wherein a configuration that enables an operator to arbitrarily select a usable state or an unusable state in accordance with the authentication result displayed on the display unit is adopted.

16. A management device capable of communicating with the electric device main body and the power device according to claim 4, the management device comprising:
an input portion, comprising a keyboard or a touchpad, for inputting authentication information;
a processor configured to function as:
a reception portion for receiving a predetermined authentication code from the electric device main body and the power device; and
a control portion for causing a device which is a transmission source of the predetermined authentication code to be in an unusable state in a case where an authentication code specified by the authentication information input by the input portion does not match the predetermined authentication code received by the reception portion.

17. The management device according to claim 16, wherein the authentication code includes a manager code, the predetermined authentication code is the manager code, and
the control portion permits changes in the first use permission code and the second use permission code of a device which is a transmission source of the manager code in a case where an authentication code specified on the basis of authentication information which is input by the input portion matches a manager code received by the reception portion.

* * * * *